United States Patent
Wu et al.

(10) Patent No.: US 8,433,695 B2
(45) Date of Patent: Apr. 30, 2013

(54) SYSTEM ARCHITECTURE FOR INTEGRATED HIERARCHICAL QUERY PROCESSING FOR KEY/VALUE STORES

(75) Inventors: Jianming Wu, San Jose, CA (US); Guangyu Shi, Cupertino, CA (US); Masood Mortazavi, San Jose, CA (US); Avraham Kapuya, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/098,177

(22) Filed: Apr. 29, 2011

(65) Prior Publication Data

US 2012/0005419 A1 Jan. 5, 2012

Related U.S. Application Data

(60) Provisional application No. 61/361,256, filed on Jul. 2, 2010.

(51) Int. Cl.
*G06F 17/30* (2006.01)

(52) U.S. Cl.
USPC ............ 707/705; 707/762; 707/769; 707/778

(58) Field of Classification Search .................. 707/705, 707/747, 769, 762, 778
See application file for complete search history.

(56) References Cited

U.S. PATENT DOCUMENTS

| | | | |
|---|---|---|---|
| 5,544,357 A | 8/1996 | Huei | |
| 5,960,194 A * | 9/1999 | Choy et al. ........................... | 1/1 |
| 7,185,317 B2 * | 2/2007 | Fish et al. ....................... | 717/121 |
| 7,836,037 B2 * | 11/2010 | Renkes et al. ................. | 707/705 |
| 7,836,178 B1 * | 11/2010 | Bedell et al. ................... | 709/225 |
| 2002/0120598 A1 * | 8/2002 | Shadmon et al. .................. | 707/1 |
| 2003/0074342 A1 * | 4/2003 | Curtis .............................. | 707/1 |
| 2003/0135495 A1 * | 7/2003 | Vagnozzi .......................... | 707/3 |
| 2004/0133927 A1 * | 7/2004 | Sternberg et al. ............. | 725/136 |
| 2004/0167922 A1 | 8/2004 | Yanase et al. | |

(Continued)

FOREIGN PATENT DOCUMENTS

CN 1139489 A 1/1997

OTHER PUBLICATIONS

Foreign Communication From a Related Counterpart Application, PCT Application PCT/CN2011/076716, International Search Report dated Sep. 15, 2011, 3 pages.

(Continued)

*Primary Examiner* — Hanh Thai

(74) *Attorney, Agent, or Firm* — Conley Rose, P.C.; Grant Rodolph

(57) ABSTRACT

A key/value store comprising a first tier storage device configured to store information about a plurality of keys for a plurality of values without the values, and a second tier storage device coupled to the first tier storage device and configured to store the values associated with the keys without the keys, wherein the first tier storage device has lower latency and higher throughput than the second tier storage device, and wherein the second tier storage device has higher capacity than the first tier storage device. Also disclosed is a method comprising receiving a key/value operation request at a first tier storage device, mapping a key in the key/value operation request to a locator stored in a second tier storage device if the key/value operation request is valid, and mapping the locator to a value in a third tier storage device if the key has a corresponding locator.

20 Claims, 7 Drawing Sheets

U.S. PATENT DOCUMENTS

| | | | |
|---|---|---|---|
| 2005/0033733 A1* | 2/2005 | Shadmon et al. | 707/2 |
| 2005/0278316 A1* | 12/2005 | Carlson et al. | 707/3 |
| 2006/0041544 A1* | 2/2006 | Santosuosso | 707/4 |
| 2006/0155915 A1* | 7/2006 | Pereira | 711/100 |
| 2006/0161525 A1* | 7/2006 | Bordawakar et al. | 707/3 |
| 2007/0038755 A1* | 2/2007 | Sullivan et al. | 709/226 |
| 2008/0065596 A1* | 3/2008 | Shadmon et al. | 707/2 |
| 2008/0091645 A1* | 4/2008 | Gay | 707/2 |
| 2008/0091646 A1* | 4/2008 | Al-Omari et al. | 707/2 |
| 2008/0319957 A1* | 12/2008 | Muralidhar et al. | 707/4 |
| 2009/0164213 A1* | 6/2009 | Lennington et al. | 704/231 |
| 2009/0228514 A1* | 9/2009 | Liu et al. | 707/102 |
| 2009/0300351 A1* | 12/2009 | Lei et al. | 713/165 |
| 2010/0278439 A1* | 11/2010 | Lennington et al. | 382/209 |
| 2010/0321183 A1* | 12/2010 | Donovan et al. | 340/540 |
| 2011/0055232 A1* | 3/2011 | Graefe | 707/752 |
| 2011/0082866 A1* | 4/2011 | Brown | 707/744 |
| 2011/0125772 A1* | 5/2011 | Ah-Soon et al. | 707/759 |
| 2011/0246503 A1* | 10/2011 | Bender et al. | 707/769 |
| 2011/0302189 A1* | 12/2011 | Liu et al. | 707/769 |
| 2012/0159091 A1 | 6/2012 | Li et al. | |

OTHER PUBLICATIONS

Foreign Communication From a Related Counterpart Application, PCT Application PCT/CN2011/076716, Written Opinion dated Sep. 15, 2011, 6 pages.

* cited by examiner ically by storage capacity. Some key/value stores may be designed with more emphasis on performance than capacity, and others may emphasize capacity more than performance. However, it may be difficult to improve both performance and capacity by substantial amounts in many key/value store systems, e.g., due to cost considerations.

SYSTEM ARCHITECTURE FOR INTEGRATED HIERARCHICAL QUERY PROCESSING FOR KEY/VALUE STORES

CROSS-REFERENCE TO RELATED APPLICATIONS

The present application claims the benefit of U.S. Provisional Patent Application No. 61/361,256 filed Jul. 2, 2010 by Avraham Kapuya and entitled "Two Tiered Low Latency, Very Large Persistent Indexing Method Using Memory (RAM) and SSD," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A network is a collection of computers, devices, and other resources that are interconnected by communications channels. A network facilitates communications between users of the computers and devices within the network and allows users to share the computers, devices, and other resources of the network. Enterprises may utilize networks for a variety of purposes including, for example, for data management and for file and storage systems.

For example, some current networks include content networks that provide content to customers, such as on demand content. In a content routing based network, a content router is responsible for routing user requests and content to proper recipients. In the content routing based network, a domain-wide unique name is assigned to each entity that is part of a content delivery framework. The entities may comprise data content, such as video clips or web pages, and/or infrastructure elements, such as routers, switches, or servers. The content router uses name prefixes (which can be full content names or proper prefixes of content names) to route content packets within the content network. As such, the routing decision space is extended a substantially larger name space in comparison to the limited Internet Protocol (IP) prefix space. The content routing based network may also store data content, for example in one or more content servers.

SUMMARY

In one embodiment, the disclosure includes a key/value store comprising a first tier storage device configured to store information about a plurality of keys for a plurality of values without the values, and a second tier storage device coupled to the first tier storage device and configured to store the values associated with the keys without the keys, wherein the first tier storage device has lower latency and higher throughput than the second tier storage device, and wherein the second tier storage device has higher capacity than the first tier storage device.

In another embodiment, the disclosure includes a network component comprising a receiver configured to receive a plurality of hit queries and non-hit queries, a first tier storage medium configured to store a plurality of keys for a plurality of values, a second tier storage medium configured to store the values, and a logic circuitry configured to process the hit queries at the first tier storage medium and the second tier storage medium and to process the non-hit queries only at the first tier storage medium without accessing the second storage medium.

In a third aspect, the disclosure includes a method comprising receiving a key/value operation request at a first tier storage device, mapping a key in the key/value operation request to a locator stored in a second tier storage device if the key/value operation request is valid, and mapping the locator to a value in a third tier storage device if the key has a corresponding locator.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
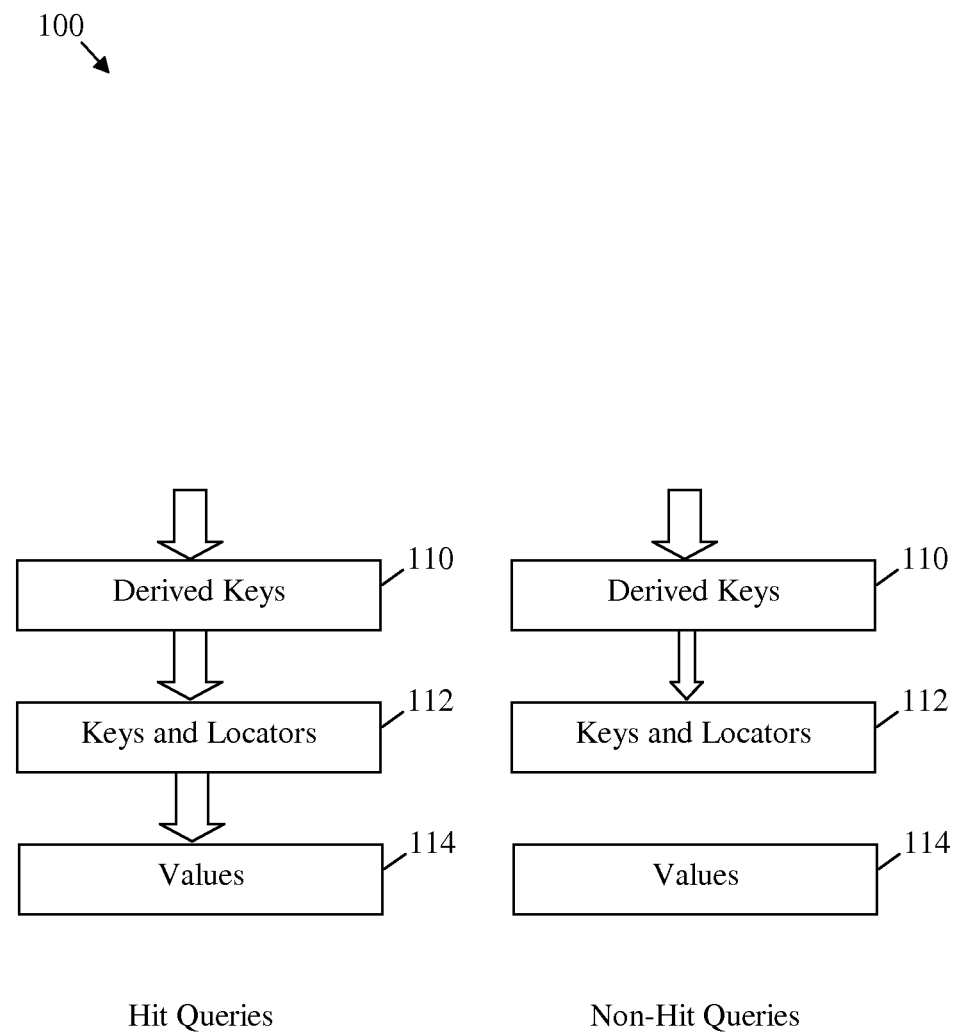
FIG. 1 is a schematic diagram of an embodiment of hierarchical query processing scheme.

It should be understood at the outset that although an illustrative implementation of one or more embodiments are provided below, the disclosed systems and/or methods may be implemented using any number of techniques, whether currently known, unknown or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A data content may be stored as a value in a network, e.g., in a value store. A key associated with the content or value may be used to index the value in the value store (e.g., upon adding the value to the value store) or to retrieve the associated value from the value store. The key may also be stored in the network, e.g., in a key store. The combined key store and value store is referred to herein as a key/value store, which may be used to store and maintain key/value entries. The key/value store may be configured to support a plurality of operations for the key/value entries, including insertion, deletion, and query.

Performance and capacity are two important considerations in designing a key/value store. Since a query operation may be one of the more frequently used operations for a key/value store, performance may be characterized by the length of time a query may be completed, which is also referred to as latency. Performance may also be characterized by the number of queries that may be completed in a period of time, which is referred to as throughput. The capacity of a key/value store may be measured by the quantity of entries that may be stored or handled in the key/value store. Improving both performance and capacity simultaneously may be challenging, e.g., due to the limits of hardware and cost. For example, a typical key/value store that is optimized for performance may have a less satisfying capacity on the order of millions of entries (e.g., depending on the entry size). A typical key/value store that is optimized for capacity may have a less satisfying latency on the order of milliseconds and a throughput on the order of thousands of queries per second.

Disclosed herein is a system and method for providing a key/value store that may have improved performance and capacity in comparison to current systems. The key/value store may be implemented, for example, as a standalone service, or as a part of a larger system or network, such as a data management system, a file and storage system, or a content routing based network. The system may be based on a key/value store architecture that may support a relatively low latency, high throughput, and large capacity key/value store. The key/value store architecture may support hierarchical query processing and integrating hardware and software functionalities to provide both improved capacity and performance. The hierarchical query processing may be achieved by decoupling the locations of the stored keys and the corresponding stored values.

FIG. 1 illustrates an embodiment of a hierarchical query processing scheme 100 that may be implemented in a network. The hierarchical query processing scheme 100 may handle two types of query requests: hit queries and non-hit queries. The hit queries may comprise query requests to content or values that may be present in the value store, and thus may be successfully fulfilled. The non-hit queries may comprise invalid queries and/or query requests to content or values that may not be present in the value store, and thus may not be fulfilled. The hierarchical query processing scheme 100 may comprise about three processing layers, a first query processing layer 110 at the top, a second query processing layer 112 in the middle, and a third query processing layer 114 at the bottom.

The first query processing layer 110 may be configured to process derived keys and map the derived keys to the actual keys in the second query processing layer 112. The derived keys may be compact data structures of keys instead of the actual keys, which may require less resources and allow faster query processing. For instance, the first query processing layer 110 may comprise a bloom filter that serves as a compact data structure for keys and allows faster membership query in comparison to processing actual keys. Alternatively, the first query processing layer 110 may handle received hashed keys instead of the actual keys to accelerate the query process. In other embodiments, the first query processing layer 110 may use other compact key processing schemes. The second query processing layer 112 may be configured to process the actual keys and map the actual keys to value locators or indices in the third query processing layer 114. The value locators may indicate the location of values that correspond to the keys. The third query processing layer 114 may be configured to process the locators of the values to access the corresponding values that may comprise the requested content with minimal processing and communication resource cost.

The hit queries may be processed at the first query processing layer 110, the second query processing layer 112, and subsequently the third query processing layer 114 to access the requested values corresponding to the indicated keys. Thus, all the received hit queries may be processed at each of the three layers, which is indicated by the same size arrows between the three layers, where the arrow size represents the amount of query requests. The non-hit queries may be processed at the first query processing layer 110 and at least some of the non-hit queries may be processed at the second query processing layer 112. For example, only the valid queries, e.g., that comprise valid keys or compact keys, may be processed at the second query processing layer 112, while the invalid queries may be discarded (after processing) at the first query processing layer 110. In another example, most of the query requests for non-existed values may be filtered out at the first query processing layer 110. This is indicated by the smaller size arrow between the first query processing layer 110 and the second query processing layer 112. Further, all the non-hit queries that reach the second query processing layer 112 may be discarded (after processing) and none of the non-hit queries may reach the third query processing layer 114, since such queries may not have corresponding values in the value store. This is indicated by the absence of an arrow between the second query processing layer 112 and the third query processing layer 114.

Separating or decoupling the query processing steps into the three layers in the hierarchical query processing scheme 100 may avoid allocating unnecessary or unused system resources (e.g., processing time, cost, and/or power) for non-hit queries, and thus improve performance (e.g., latency and throughput). The early termination of non-hit queries using the hierarchical query processing scheme 100 may also mitigate or reduce denial-of-service (DoS) or distributed DoS (DDoS) attacks on the system, since such attacks may comprise invalid queries and/or may not have corresponding values in the value store.

In some systems, the store key/value may be stored in one or more storage devices, which may include Dynamic Random Access Memory (DRAM), Solid State Drive (SSD), and Hard Disk Drive (HDD). Among the three storage devices, the DRAM may have the highest performance among the three but the lowest capacity, the SSD may have a middle capacity and performance, and the HDD may have the highest capacity but the lowest performance. For example, the DRAM's latency may be on the order of nanoseconds (e.g., about 10 nanoseconds) and the DRAM's throughput may be on the order of gigabytes per second (GB/s) or about 100,000 queries per second. The capacity of the DRAM on a typical server may be about 100 GB. In comparison, the SSD may have a latency on the order of microseconds and a throughput on the order of megabytes per second (MB/s). The capacity of the SSD on a typical server may be about 10 times the capacity of the DRAM, e.g., about one terabyte (TB). The HDD may have a latency on the order of milliseconds, a throughput on the order of MB/s, and a capacity of about 10 times the capacity of the SSD, e.g., on the order of billions of entries.

The properties of the DRAM, SSD, and HDD are summarized in Table 1. The storage devices are classified into three tiers where the storage device at the higher tier has higher performance and higher cost than the storage device on the lower tier. The performance to cost ratio may represent the storage technology advancement level for the storage devices. For instance, a storage device that is manufactured with higher performance/cost ratio may be based on a more advanced technology than a storage device with lower performance/cost ratio. Additional tiers may be added to the list in Table 1 as new storage devices with different characteristics and properties may emerge.

TABLE 1

Storage device properties.

| TIER | STORAGE DEVICES | LATENCY MAGNITUDE | THROUGHPUT MAGNITUDE | UNIT PRICE | MAX CAPACITY PER SERVER |
|---|---|---|---|---|---|
| 1 | DRAM | NANOSECOND | ~GB/S | ~$20/GB | ~100 GB |
| 2 | SSD | MICROSECOND | >200 MB/S | ~$2/GB | ~1 TB |
| 3 | HDD | MILLISECOND | <100 MB/S | ~$0.05/GB | ~10 TB |

Designing a key/value store system that has both high performance and large capacity may be difficult due to the storage device properties and cost. Typically, to achieve high performance, a plurality of key/value entries may be stored on a relatively faster storage device, such as the DRAM. However, the hardware and cost of DRAM may limit the available capacity for entries. For example, if the average size of an entry is equal to multiple kilobytes (KB), e.g., less than about 10 KBs, then the hardware and cost may limit the total quantity of entries on the order of millions. The unit price of a DRAM may be about 10 times the unit price of a SSD and about 200 times the unit price of a HDD. Thus, putting the collection of key/value entries on the DRAM may be more costly than using other storage devices.

Figure 2:
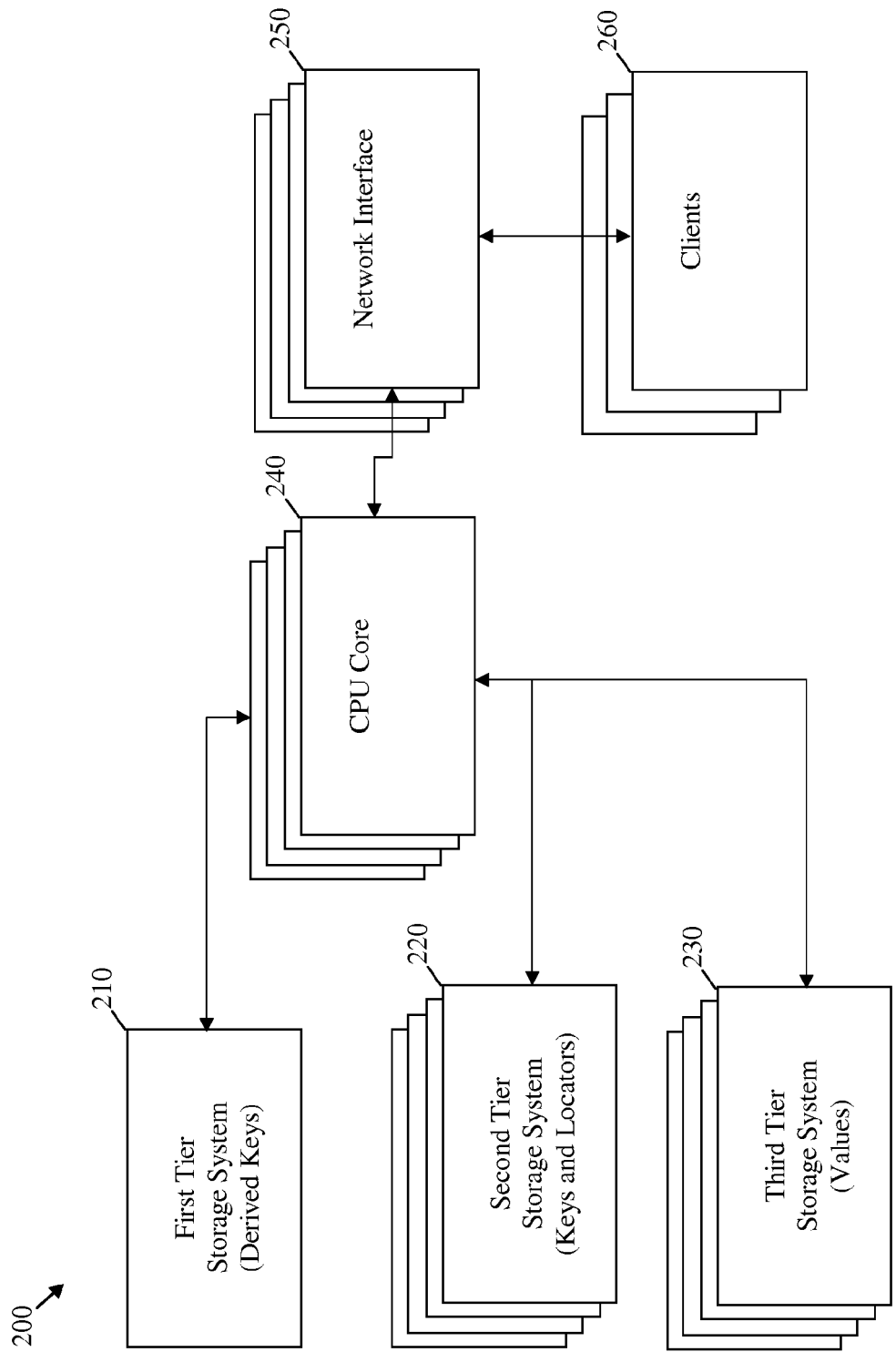
FIG. 2 is a schematic diagram of an embodiment of a key/value store architecture.

Typically, to achieve large capacity, a plurality of key/value entries may be stored on a larger capacity storage device, such as the HDD. The HDD may have a substantially lower unit price than other storage devices (e.g., DRAM and SSD). For example, the HDD may support a key/value store with a size on the order of TBs. If the average size of an entry is equal to multiple kilobytes (KB), then the quantity of key/value entries that may be stored may be on the order of billions. However, the performance of the HDD may not be acceptable, e.g., below system requirements for latency and throughput. For example, the HDD's latency may be about 1,000,000 times higher than the DRAM's latency and the HDD's throughput may be about 0.1 percent the DRAM's throughput FIG. 2 illustrates an embodiment of a key/value store architecture 200 that may be implemented as a stand alone system or in a network. The key/value store architecture 200 may support a key/value store that has both high performance and large capacity and may be based on the hierarchical query processing scheme 100. The key/value store architecture 200 may provide a three tiered key/value store based on three tiers of storage devices, for example a DRAM, a SSD, and a HDD. The key/value store architecture 200 may comprise a first tier storage system 210, at least one second tier storage system 220, at least one third tier storage system 230, at least one Central Processing Unit (CPU) core 240, at least one corresponding network interface 250, and one or more clients 260. The components of the key/value store architecture 200 may be coupled to each other as shown in FIG. 2. The first tier storage system 210, second tier storage system 220, third tier storage system 230, and CPU core 240 may be located in a computer system or a server, which may be coupled to each client 260 via corresponding network interface 250. The computer system or server may be located at or coupled to a router in the network, such as, for example, a content router in a content routing based network.

The first tier storage system 210 may be configured to store and manage a plurality of derived or actual keys pairs. For instance, the first tier storage system 210 may be a DRAM that hosts the first query processing layer 110, which maps the derived keys to the actual keys in the second query processing layer 112. The second tier storage system 220 may be configured to store and manage the derived or actual keys and a plurality of corresponding locators or indices. For instance, the second tier storage system 220 may be a SSD that hosts the second query processing layer 112, which maps the actual keys to the locators in the third query processing layer 114. The third tier storage system 230 may be configured to store and manage the values that correspond to the locators and the keys. For instance, the third tier storage system 230 may be a HDD that hosts the third query processing layer 114, which maps the locators to the values.

The CPU core 240 may be configured to receive requests for key/value operations from the clients 260 via the network interface 250, such as insertion, deletion, and query requests. The requests may comprise hit queries and/or non-hit queries, which may be forwarded to the first tier storage system 210. For example, the CPU core 240 may forward the requests to the first query processing layer 110 that runs on the first tier storage system 210. The network interface 250 may be configured to receive and forward requests, e.g., content requests, from the clients 260 to the CPU core 240. The network interface 250 may also forward replies, which may comprise the requested content or values, from the CPU core 240 to the clients 260. The clients 260 may comprise customer nodes and/or devices, which provide content to a plurality of users. For example, the clients 260 may comprise modems that connect to customer premises, user equipment or devices that allow customers to view or play content, or both.

Typically, in some systems, the key/value pairs may be stored jointly on the same storage device or system, and thus may be accessed at about the same time. In other systems, the key/value pairs may be split into different groups on the same storage devices to improve performance. In some systems, storage devices with higher performances may also be used as cache to accelerate a portion of the operations. However, in the key/value store architecture 200, the keys and values may be physically separated and stored on different tiers of storage systems (e.g., with different properties in terms of performance and capacity), which supports a hierarchical query processing, as described above. The keys and values may still be accessed logically as key/value pairs.

Decoupling and placing the key/value pairs on a multi-tiered storage system may provide a flexible key/value store that has relatively high performance and high capacity. Specifically, the keys (derived and actual keys) may be stored on higher tier storage devices (in terms of performance) that correspond to the first tier storage system 210 and the second tier storage system 220, such as a DRAM and a SSD. The values may be stored on a lower storage device that corresponds to the third tier storage system 230, such as a HDD. The physical separation of keys and values may allow processing hit queries and non-hit queries on different logical paths, such as in the hierarchical query processing scheme 100.

In the key/value store architecture 200, the derived and the actual keys may be stored on the first tier storage system 210 and the second tier storage system 220 to improve overall performance of the key/value store system. Since the key size may be multiple magnitudes smaller than the value size, the joint size of the keys stored in the higher tier storage devices may be a small portion of the overall data size of the key/value pairs or entries. For example, a key length may be in the range of multiple bytes to hundreds of bytes. If the key size is equal to about 256 bits (e.g., about 32 bytes), then a collection of about one billion keys may have a size of about 32 GBs, which may be stored in a DRAM or SSD. If the quantity of keys does not fit in the first tier storage system 210 (e.g., a DRAM), then a plurality of derived keys that have smaller sizes may be stored instead in the higher tier storage device. For example a plurality of hashed key values or bloom filter representations of the keys may be stored in the DRAM instead of the actual keys. The derived keys may be used in the hierarchical query processing scheme 100 to represent and obtain the actual keys (stored on the second tier storage system 220). The derived keys may also be used to differentiate the hit queries and the non-hit queries instead of the actual keys.

Determining the non-hit queries may improve system performance since the processing path for non-hit queries may be terminated early to reduce the unnecessary use of system resources, for instance without accessing the third tier low-performance storage system 230 (e.g., a HDD) to locate stored values. Storing the derived keys or the actual keys at the first tier storage system 210 and the second tier storage system 220 instead of the third tier storage system 230 may also improve performance in determining non-hit queries, since the higher tier storage devices may have lower latency and higher throughput. Additionally, storing the values at the third tier storage system 230 may increase the capacity of the key/value store system and reduce cost. The third tier storage system 230 may have larger capacity and lower unit price than the higher tier storage devices. For instance, the stored values in the third tier storage system 230 may comprise about 90 percent of the total capacity of a key/value storage system, such as in a computer storage system. Since the values may account for the majority of the total key/value data size, taking advantage of the capacity the third tier storage system 230 may improve the overall capacity of the system.

Storing the values at the third tier storage system 230 may also improve the performance of the system. Separating the values from the keys as such may simplify entering and managing the key/values, which may result in improved performance. The query operation performance may be improved since the locator of the requested value may be obtained using the corresponding key at the second tier storage system 220 (e.g., a SSD) and hence only one access to the third tier storage system 230 (e.g., a HDD) may be needed to retrieve the value. If the keys and values were both stored on the third tier storage system 230, then at least two accesses may be needed to retrieve the value. The key/value pair insertion operation performance may also be improved since storing mapping information about the keys and values may not be needed on the third tier storage system 230. Instead, the values may be organized in the third tier storage system 230 in an append-only style, such as in a log-structured file system, which may simplify the insertion of new entries. In the case of mechanical storage devices (e.g., HDDs), performance may be improved due to sequential write workload.

A multi-tiered storage system, such as the key/value store architecture 200 may provide high performance and large capacity and may also enable more design flexibility for key/value stores, e.g., to achieve various levels of performance and capacity requirements. For instance, the multi-tiered storage system may be a three tiered key/value store, such as the key/value store architecture 200, or a two tiered key/value store. For example, the two tiered key/value store may comprise a DRAM and a SSD, a DRAM and a HDD, or a SSD and a HDD. The multi-tiered storage system may also comprise more than three tiers of storage devices, which may have different performances and capacities.

Additionally, the multi-tiered storage system may support data caching to accelerate a portion of the operations. Accordingly, the multi-tiered storage system may comprise multiple tiers of storage devices for storing keys and values and an additional or part of some existing storage device that serves as a cache for some of the stored keys and/or values. The additional cache may have higher performance than the other storage devices in the system and may be used to reduce latency and improve throughput. The cache may not be used explicitly to store keys and values on a permanent or relatively long time basis but to enhance the performance of key/value operations, for instance by storing and accessing some of the keys or values for a relatively short time during processing. For example, in a two-tiered key/value that comprises a SSD for storing keys and locators and a HDD for storing values, a DRAM may serve as cache to store and access some of the keys at relatively faster time.

Figure 3:
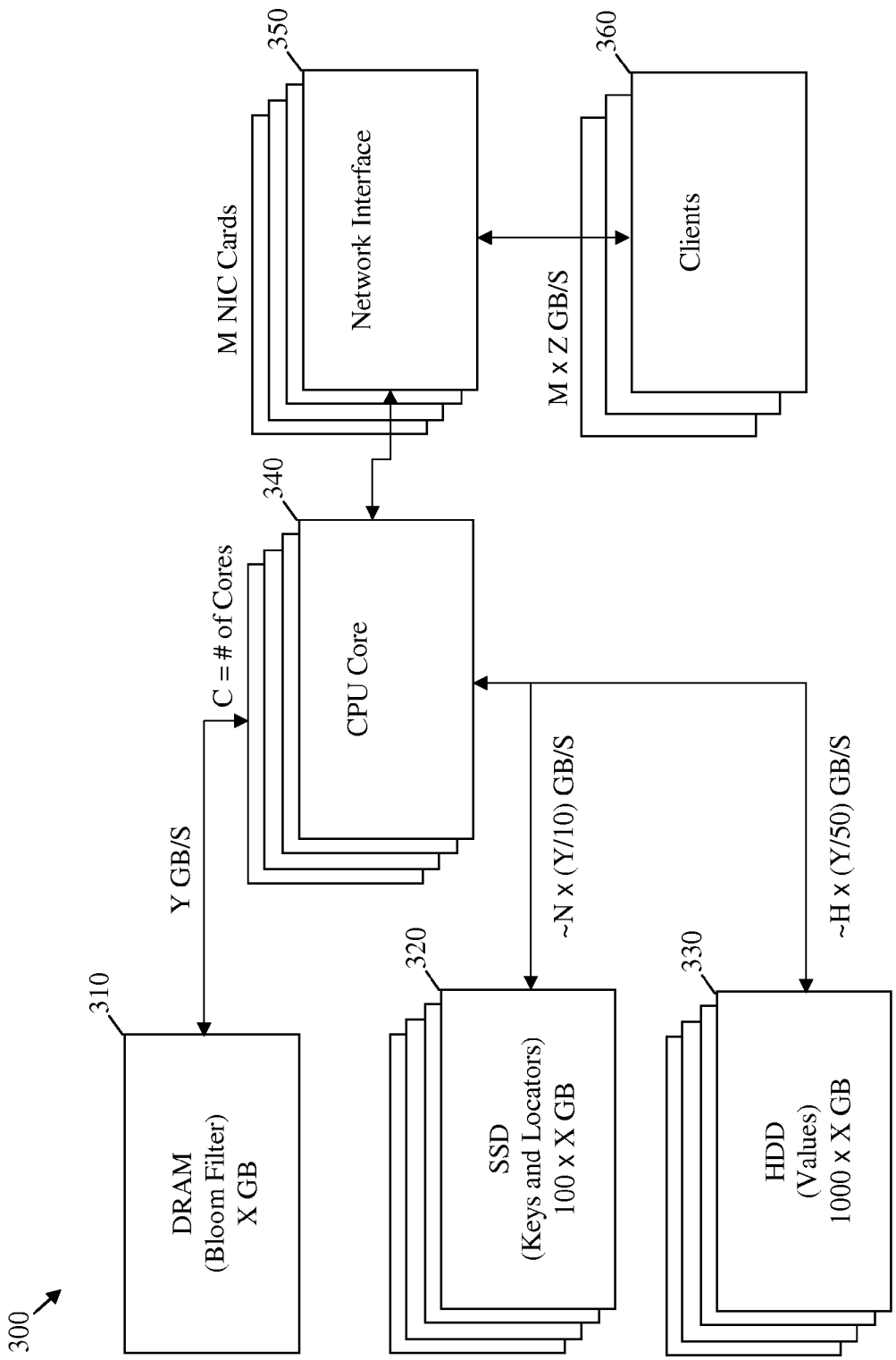
FIG. 3 is a schematic diagram of another embodiment of a key/value store architecture.

FIG. 3 illustrates another embodiment of a key/value store architecture 300 that may provide a multi-tiered storage system. The key/value store architecture 300 may provide a three tiered key/value store based on three tiers of storage devices and may support the hierarchical query processing scheme 100. The key/value store architecture 300 may comprise a DRAM 310, at least one SSD 320, at least one HDD 330, at least one CPU core 340, at least one corresponding network interface 350, and one or more clients 360. The components of the key/value store architecture 300 may be configured substantially similar to the corresponding components of the key/value store architecture 100.

Assuming an average key size of about 16 bytes and an average value size of about four KB, the total capacity of the key/value store architecture 300 may be equal to about 10 billion key/value entries. The total capacity may correspond to the combined capacity of each of the DRAM 310, the SSD(s) 320, and the HDD(s) 330. Further, the throughput of a SSD 320 may be about one tenth the throughput of the DRAM 310, and the throughput of a HDD 330 may be about 1/50 the throughput of the DRAM 310. For the DRAM 310, the capacity is indicated by X GB (X is a number) and the throughput is indicated by Y GB/S in FIG. 3 (Y is a number). For the SSD 320, the capacity is indicated by 100×X GB and the throughput is indicated by N×(Y/10) GB/S (N is an integer). For the HDD 330, the capacity is indicated by 1000×X GB and the throughput is indicated by H×(Y/50) GB/S (H is an integer). Further, the number of CPU cores 340 is indicated by C (C is an integer), the number of network interfaces 350 (or network interface cards (NICs)) is indicated by M (M is an integer), and the number of clients 360 is indicated by M×Z (Z is an integer), where Z is the number of clients per NIC.

The DRAM 310 may host a bloom filter that provides derived keys. The bloom filter may be processed at the first query processing layer 110 to map the derived keys to the actual keys in the second query processing layer 112. Using the bloom filter to represent the keys may reduce the space (capacity) needed at the DRAM 310 but may result in slightly reduced accuracy. The size of the bloom filter, which may be used to represent a quantity of members (keys), may be determined based on a desired false positive rate (FPR). For example, if a one percent FPR is needed, then about 10 bits may be sufficient to represent each key in the bloom filter. As such, about 32 GB of DRAM may store about 25.6 billion keys. In this case, most (e.g., about 99 percent) of the non-hit queries may be filtered out by the bloom filter in the DRAM 310 within several (e.g., less than about 10) nanoseconds.

The SSD 320 may host the original keys and locators, which may be processed at the second query processing layer 210 to map the locators to the values in the third query processing layer 114. The HDD 330 may host the values, which may be processed at the third query processing layer 114. The original keys and locators may be used to determine whether a queried key is located in the key store in the SSD 320 and to determine the location of the corresponding value in the value store in the HDD 330. For non-hit queries, the latency of the system may be about one microsecond and the throughput may be about tens of millions of queries per second. For hit queries, the latency may be about 10 milliseconds and the throughput may correspond to the total throughput of the HDD(s) 330 at about 4 KB of read size (e.g., about several MB/s) or multiple thousands (e.g., about 10 thousands) of queries per second. The capacity of the system may be on the order of multiple tens of billions of key/value entries.

Figure 4:
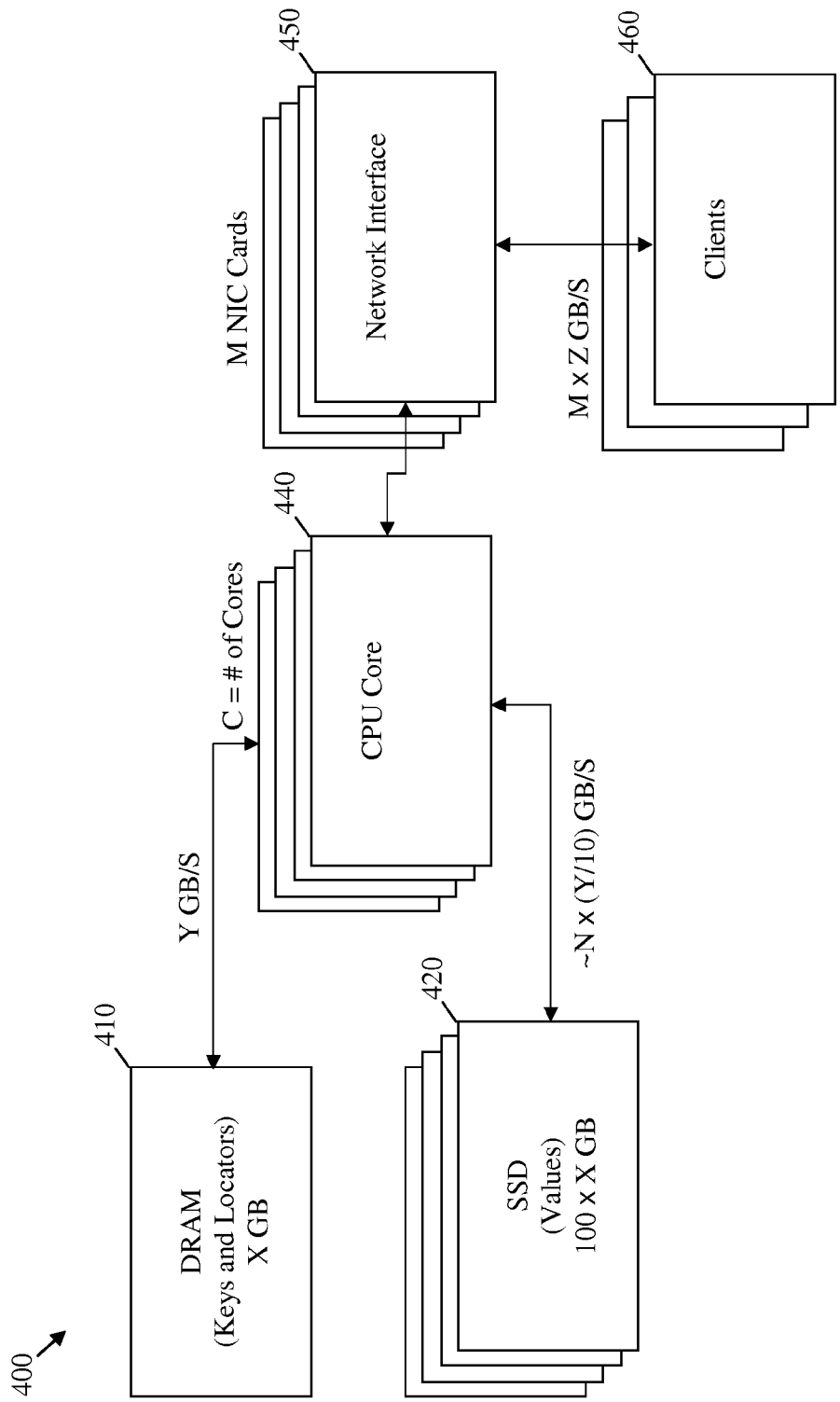
FIG. 4 is a schematic diagram of another embodiment of a key/value store architecture.

FIG. 4 illustrates another embodiment of a key/value store architecture 400 that may provide a two tiered key/value store and support the hierarchical query processing scheme 100. The key/value store architecture 400 may comprise a DRAM 410, at least one SSD 420, at least one CPU core 440, at least one corresponding network interface 450, and one or more clients 460. The components of the key/value store architecture 400 may be configured substantially similar to the corresponding components of the key/value store architecture 100. The DRAM 410 and the SSD 420 may have the same capacity and throughput as the DRAM 310 and the SSD 320, respectively. However, the DRAM 410 may host the original or derived keys and locators that may be processed (e.g., at the second query processing layer 112) to map the locators to the values. The SSD 420 may host the values that may be processed (at the third query processing layer 114) to provide the requested content to the client(s) 460. The key/value store architecture 400 may not comprise a HDD to store the values, which may improve the performance of the system but reduce its capacity, e.g., in comparison to the key/value store architecture 300.

The capacity of the key/value store architecture 400 may be on the order of multiple billions of key/value entries. Each entry in the DRAM 410 may comprise a key of about 16 bytes and a locator of about 16 bytes. Each locator may comprise a pointer to the associated value on the SSD 420 and a length of the value. Each of the pointer and the length may be about eight bytes in size. As such, storing about one billion keys may require about 32 GB of DRAM space. The values may be stored on the SSD(s) 420 in the append-only style. When processing a query, the associated key may be located in the DRAM 410 and subsequently one access to the SSD 420 may be needed to retrieve the value. Thus, if about 10 SSDs 420 are used and load balanced in the key/value store architecture 400, then the throughput of the SSDs 420 may match the throughput of the DRAM, which may be on the order of multiple hundreds of thousands of queries per second about. In this case, the query latency may be largely determined by one SSD access, which may be about 100 microseconds for hit queries and about 10 nanoseconds for non-hit queries. The system throughput may be about 100 thousand queries per second for hit queries and about 10 million queries per second for non-hit queries. The system capacity may be determined by the total capacity of the SSDs 420, which may be on the order of multiple TB or tens of billions of key/value entries.

In another embodiment, the capacity of the key/value store architecture 400 may be extended by replacing the SSD 420 by a HDD. As such, the capacity may be extended by more than about 10 times but the system latency may be increased and the throughput may be reduced due to the reduce performance of HDD. However, for non-hit queries, the system latency may remain the same as the DRAM latency. In comparison to typical key/value stores based on HDDs, the HDD based two tiered key/value store may still have lower latency and higher throughput due to the reduced number of HDD accesses needed for both hit queries and non-hit queries.

Further, the DRAM space in the key/value store architecture 400 may be reduced by storing derived keys in the DRAM 410 instead of the original keys. For instance, an about 8 bytes hash value may be used instead of an about 16 bytes original key. Additionally, more compact locator structures may be used in the DRAM 410 to further save space. However, reducing the size of keys and/or locators may decrease efficiency. For example, the FPR will be increased, as in the case of using a bloom filter instead of the original keys. This may increase the probability for some non-hit queries to reach the SSD 420 instead of being discarded at the DRAM 410, which may be a trade-off between capacity and performance.

Figure 5:
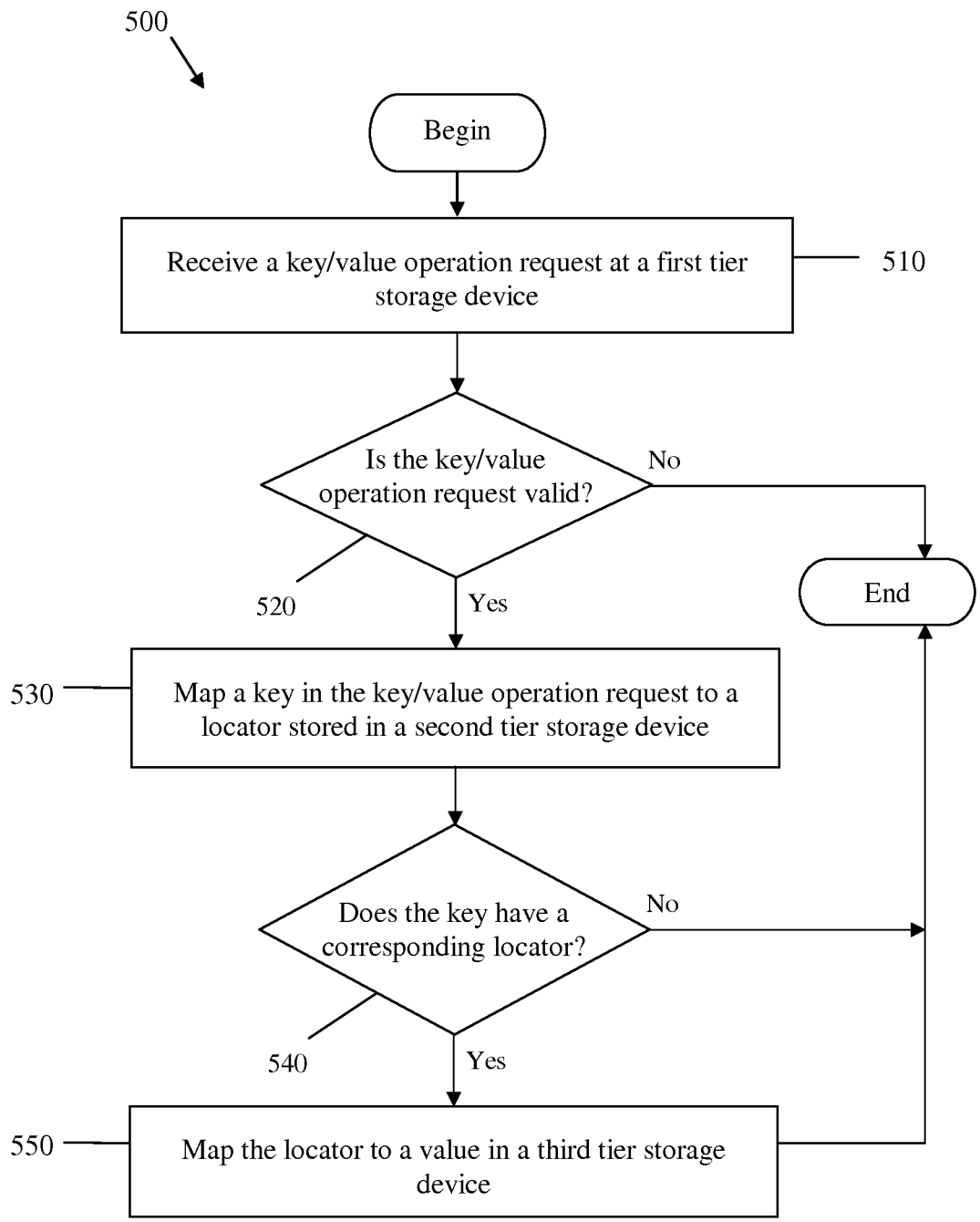
FIG. 5 is a flowchart of an embodiment of a hierarchical query processing method.

FIG. 5 illustrates an embodiment of a hierarchical query processing method 500 that may be based on the hierarchical query processing scheme 100. The hierarchical query processing method 500 may be implemented in a multi-tiered storage system, for example based on the key/value store architecture 200, the key/value store architecture 300, or the key/value store architecture 400. Using the hierarchical query processing method 500 in the multi-tiered storage system may improve the overall system capacity and performance (e.g., latency and throughput).

The method 500 may begin at block 510, where a key/value operation request may be received at a first tier storage device. The key value operation request may comprise a key, e.g., a derived key, associated with content requested by a customer. The key/value operation request may be processed at a first tier device, such as a DRAM, which may have relatively high performance and may have low capacity. At block 520, the method 500 may determine whether the key/value operation request is valid. For instance, the received request may correspond to a non-hit query that does not comprise a proper key/value operation request or a valid key, such as in the case of a DoS attack. If the key/value operation request is valid, then the method 500 may proceed to block 520. Otherwise, the key/value operation request may be discarded and the method 500 may end. Discarding invalid requests or non-hit queries may free the system to handle valid requests, e.g., hit queries, and thus further improve performance. The key/value operation request may also be handled at the first tier storage device with reduced latency, which may further improve protection against DoS or DDoS attacks on the system.

At block 530, a key in the key/value operation request may be mapped to a locator stored in a second tier storage device. The locator may indicate the location of a value that corresponds to the key. The second tier storage device may have lower performance than the first tier storage device but higher capacity to accommodate the keys and locators, such as a SSD. At block 540, the method 500 may determine whether the key has a corresponding value, e.g., in the list of key/locator entries. For instance, the received request may correspond to a non-hit query where the key may not have a corresponding value or content and thus may not be associated with a locator in the second tier storage device. If the key is associated with a locator, e.g., has a corresponding stored value, then the method 500 may proceed to block 550. Otherwise, the key/value operation request may be discarded and the method 500 may end. Discarding such non-hit queries may improve system performance and prevent unnecessary use of resources since the value store may not be accessed unless a value may be accessed.

At block 550, the locator may be mapped to a value in a third tier storage device. The third tier storage device may have lower performance than the second tier storage device but higher capacity to accommodate the locators and values, such as a HDD. The value may be obtained in the third tier storage device and provided to the customer. The method 500 may then end. In other embodiments, the system may comprise only two tier storage devices, where derived or original keys may be processed and mapped to locators in a first tier storage device (e.g., DRAM or SSD) and the locators may be mapped to values in a second tier storage device (e.g., SSD or DRAM).

Figure 6:
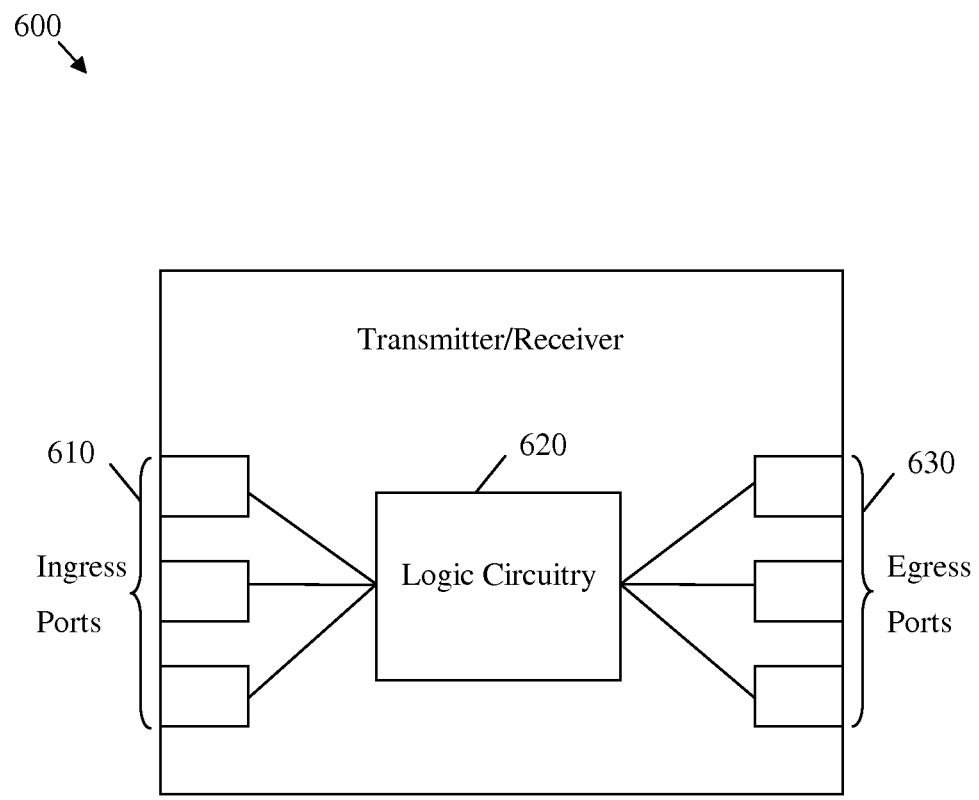
FIG. 6 is a schematic diagram of an embodiment of a transmitter/receiver unit.

FIG. 6 illustrates an embodiment of a network component 600, which may be any device that transports packets and/or contents through a network. For example, the network component 600 may be located at or correspond to a node or a router in a network. For instance, the network component 600 may be located in the router or any node in the network. The network component 600 may comprise one or more ingress ports or units 610 for receiving content, packets, objects, and/or type-length-values (TLVs) from other network components, logic circuitry 620 to determine which network components to send the packets to, and one or more egress ports or units 630 for transmitting frames to the other network components. The network component 600 may also implement the hierarchical query processing method 500 to process the content.

Figure 7:
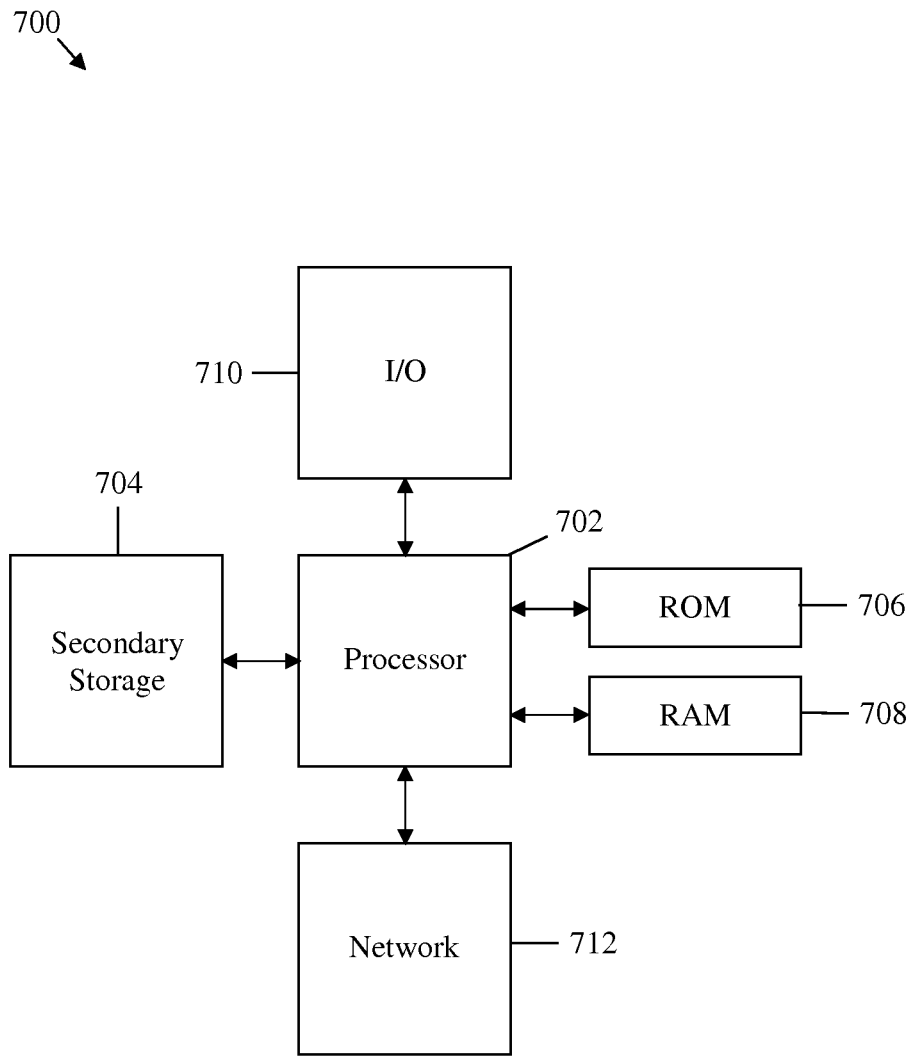
FIG. 7 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 9 7 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A key/value store comprising:
a first tier storage device configured to store information about a plurality of keys for a plurality of values without the values; and
a second tier storage device coupled to the first tier storage device and configured to store the values associated with the keys without the keys,
wherein the first tier storage device has lower latency and higher throughput than the second tier storage device, and
wherein the second tier storage device has higher capacity than the first tier storage device.

2. The key/value store of claim 1 further comprising:
a third tier storage device coupled to the first tier storage device and the second tier storage device and configured to store a plurality of locators associated with the keys and the values,
wherein the third tier storage device has higher latency and lower throughput than the first tier storage device and lower latency and higher throughput than the second tier storage device, and
wherein the third tier storage device has higher capacity than the first tier storage device and lower capacity than the second tier storage device.

3. The key/value store of claim 2, wherein the first tier storage device is a Dynamic Random Access Memory (DRAM), the third tier storage device is a Solid State Drive (SSD), and the second tier storage device is a Hard Disk Drive (HDD).

4. The key/value store of claim 2, wherein the keys are represented in the first tier device using a bloom filter, wherein the locators are stored with the corresponding keys in a list of entries in the third tier storage device, and wherein the values are associated with the corresponding locators in the second tier storage device.

5. The key/value store of claim 2, wherein a plurality of hashed keys that correspond to the keys are stored in the first tier device, wherein the locators are stored with the corresponding keys in a list of entries in the third tier storage device, and wherein the values are associated with the corresponding locators in the second tier storage device.

6. The key/value store of claim 1, wherein the first tier storage device is a Dynamic Random Access Memory (DRAM) and the second tier storage device is a Solid State Drive (SSD).

7. The key/value store of claim 1, wherein the keys and a plurality of locators associated with the keys are stored in a list of entries in the first tier storage device, and wherein the values are associated with the corresponding locators in the second tier storage device.

8. A network component comprising:
a receiver configured to receive a plurality of hit queries and non-hit queries;
a first storage medium configured to store a plurality of keys for a plurality of values;
a second storage medium configured to store the values; and
a logic circuitry configured to process the hit queries at the first storage medium and the second storage medium and to process the non-hit queries only at the first storage medium without accessing the second storage medium.

9. The network component of claim 8, wherein the hit queries comprise a plurality of valid keys that have associated values in the second tier storage medium, and wherein the non-hit queries comprise a plurality of invalid keys, do not have associated values in the second storage medium, or correspond to denial-of-service (DoS)/distributed denial-of-service (DDoS) attacks.

10. The network component of claim 9, wherein the hit queries are processed by mapping the valid keys to a plurality of locators in the first storage medium and subsequently mapping the locators to the values in the second storage medium.

11. The network component of claim 9, wherein the non-hit queries are processed by discarding the invalid keys or mapping the non-hit queries to a plurality of locators in the first storage medium and subsequently discarding the non-hit queries that are not associated with values in the second storage medium.

12. The network component of claim 9, further comprising a third storage medium configured to store a plurality of locators associated with the keys and the values.

13. The network component of claim 12, wherein the first storage medium comprises a Dynamic Random Access Memory (DRAM), the third storage medium comprises a Solid State Drive (SSD), and the second storage medium comprises a Hard Disk Drive (HDD).

14. The network component of claim 12, wherein the keys are represented in the first storage medium using a bloom filter, wherein the locators are stored with the corresponding keys in a list of entries in the third storage medium, and wherein the values are associated with the corresponding locators in the second storage medium.

15. The network component of claim 12, wherein a plurality of hashed keys that correspond to the keys are stored in the first storage medium, wherein the locators are stored with the corresponding keys in a list of entries in the third storage medium, and wherein the values are associated with the corresponding locators in the second storage medium.

16. A method comprising:
receiving a key/value operation request at a first tier storage device;
mapping a key in the key/value operation request to a locator stored in a second tier storage device if the key/value operation request is valid;
mapping the locator to a value in a third tier storage device if the key has a corresponding locator,
discarding the key/value operation at the first query processing layer if the key/value operation request or the key is not valid; and
discarding the key/value operation request at the second query processing layer if the key does not have a corresponding locator,
wherein the key/value operation request is processed at a first query processing layer to obtain the key,
wherein the key is mapped to the locator at a second query processing layer, and
wherein the locator is mapped to the value at a third query processing layer.

17. The method of claim 16 further comprising mapping the key/value operation to the key using a bloom filter or a hash key in the key operation request at a third highest tier storage device.

18. The method of claim 16 further comprising caching some of the keys, some of the values, or both at a third highest tier storage device or at a part of the higher tier storage device and using the cached keys and values to process the key/value operation request.

19. The method of claim 16, wherein the third tier storage is configured to store the values associated with the keys without the keys.

20. The method of claim 16, wherein the first tier storage device has lower latency and higher throughput than the second and third tier storage devices, wherein the third tier storage device has higher capacity than the first and second tier storage devices, wherein the second storage device has a high capacity than the first storage device, and wherein the second storage device has a lower latency and a higher throughput than the third storage device.

* * * * *

UNITED STATES PATENT AND TRADEMARK OFFICE
CERTIFICATE OF CORRECTION

PATENT NO. : 8,433,695 B2  
APPLICATION NO. : 13/098177  
DATED : April 30, 2013  
INVENTOR(S) : Jianming Wu et al.

It is certified that error appears in the above-identified patent and that said Letters Patent is hereby corrected as shown below:

In the Claims

Column 14 Line 66 - Claim 20 should read as follows:

20. The method of claim 16, wherein the first tier storage device has lower latency and higher throughput than the second and third tier storage devices, wherein the third tier storage device has higher capacity than the first and second tier storage devices, wherein the second storage device has a higher capacity than the first storage device, and wherein the second storage device has a lower latency and a higher throughput than the third storage device.

Signed and Sealed this  
Eighteenth Day of June, 2013

Teresa Stanek Rea  
*Acting Director of the United States Patent and Trademark Office*